(12) United States Patent
Hashiguchi et al.

(10) Patent No.: US 10,032,122 B2
(45) Date of Patent: Jul. 24, 2018

(54) MANAGEMENT METHOD, MANAGEMENT DEVICE, AND MANAGEMENT SYSTEM

(71) Applicants: FUJITSU LIMITED, Kawasaki-shi, Kanagawa (JP); HONDA MOTOR CO., LTD., Tokyo (JP)

(72) Inventors: Naoki Hashiguchi, Yokohama (JP); Kou Kawanobe, Saitama (JP); Yasuo Kurosaki, Wako (JP); Hiroshi Ishida, Wako (JP)

(73) Assignees: FUJITSU LIMITED, Kawasaki-Shi (JP); HONDA MOTOR CO., LTD., Tokyo (JP)

( * ) Notice: Subject to any disclaimer, the term of this patent is extended or adjusted under 35 U.S.C. 154(b) by 413 days.

(21) Appl. No.: 14/595,388

(22) Filed: Jan. 13, 2015

(65) Prior Publication Data
US 2015/0229551 A1     Aug. 13, 2015

(30) Foreign Application Priority Data

Feb. 7, 2014   (JP) .................... 2014-022729

(51) Int. Cl.
*G06Q 10/06*     (2012.01)
(52) U.S. Cl.
CPC .................... *G06Q 10/06* (2013.01)
(58) Field of Classification Search
CPC ..................................................... G06F 17/30
See application file for complete search history.

(56) References Cited

U.S. PATENT DOCUMENTS

2005/0086260 A1* 4/2005 Canright .......... G06F 17/30864
2006/0161635 A1* 7/2006 Lamkin ........... G06F 17/30041
709/217

(Continued)

FOREIGN PATENT DOCUMENTS

JP     3-46059      2/1991
JP     8-292884     11/1996

(Continued)

OTHER PUBLICATIONS

Patent Abstracts of Japan, Publication No. 03-046059, published Feb. 27, 1991.

(Continued)

*Primary Examiner* — Joe Chacko
(74) *Attorney, Agent, or Firm* — Staas & Halsey LLP

(57) ABSTRACT

A computer stores connection information with respect to data items that are management targets. The connection information identifies connection sources and connection destinations. The computer executes a process including performing analysis based on the connection information with respect to first and second data, which are specified as output targets of information indicating connections; outputting first connection information as information indicating a connection between first and second data, when one or a plurality of data items that are connection destinations are traced from the first data set as a connection source, and the second data is reached as a connection destination; and outputting second connection information as information indicating a connection between third and fourth data, when one or a plurality of data items that are connection destinations are traced from the third data set as a connection source, and the fourth data is reached as a connection destination.

8 Claims, 11 Drawing Sheets

(56) References Cited

U.S. PATENT DOCUMENTS

| | | | |
|---|---|---|---|
| 2006/0218288 A1* | 9/2006 | Umezawa | G10H 1/0066 |
| | | | 709/228 |
| 2007/0129015 A1* | 6/2007 | Iwamoto | H04L 12/2854 |
| | | | 455/41.2 |
| 2009/0198746 A1* | 8/2009 | Hintze | G06F 17/30 |
| 2015/0199419 A1* | 7/2015 | Itonori | G06F 17/3012 |
| | | | 707/737 |

FOREIGN PATENT DOCUMENTS

| | | |
|---|---|---|
| JP | 10-254745 | 9/1998 |
| JP | 2000-353124 | 12/2000 |
| JP | 2001-51983 | 2/2001 |
| JP | 2001-56775 | 2/2001 |
| JP | 2002-182908 | 6/2002 |

OTHER PUBLICATIONS

Patent Abstracts of Japan, Publication No. 08-292884, published Nov. 5, 1996.
Patent Abstracts of Japan, Publication No. 10-254745, published Sep. 25, 1998.
Patent Abstracts of Japan, Publication No. 2001-051983, published Feb. 23, 2001.
Patent Abstracts of Japan, Publication No. 2001-056775, published Feb. 27, 2001.
Patent Abstracts of Japan, Publication No. 2002-182908, published Jun. 28, 2002.
Japanese Office Action dated Aug. 29, 2017 in Japanese Application No. 2014-022729.
Chinese Office Action dated Oct. 23, 2017 in related Chinese Patent Application No. 201510051382.

* cited by examiner

FIG.5

| PROJECT NAME | OBJECT NAME | DELIVERABLE NAME | OBJECT TYPE |
|---|---|---|---|
| PROJECT A | ObjA | ... | TYPE 1 |
| PROJECT A | ObjB | ... | TYPE 1 |
| PROJECT A | ObjC | ... | TYPE 1 |
| PROJECT A | ObjC | ... | TYPE 1 |
| PROJECT B | Obj1 | ... | TYPE 3 |
| PROJECT B | Obj2 | ... | TYPE 3 |
| PROJECT B | Obj3 | ... | TYPE 3 |

FIG.6

| CONNECTION SOURCE | CONNECTION DESTINATION | ATTRIBUTE 1 | ATTRIBUTE 2 |
|---|---|---|---|
| ObjA | ObjB | ... | ... |
| ObjA | ObjC | ... | ... |
| ObjA | ObjD | ... | ... |
| ObjB | Obj1 | ... | ... |
| Obj1 | Obj2 | ... | ... |
| Obj3 | ObjC | ... | ... |

MANAGEMENT METHOD, MANAGEMENT DEVICE, AND MANAGEMENT SYSTEM

CROSS-REFERENCE TO RELATED APPLICATION

This patent application is based upon and claims the benefit of priority of the prior Japanese Patent Application No. 2014-022729 filed on Feb. 7, 2014, the entire contents of which are incorporated herein by reference.

FIELD

The embodiments discussed herein are related to a management method, a management device, and a management system.

BACKGROUND

In a data management system for managing data of a deliverable such as a document created in a development process of a product, there is a system in which a folder that is the storage destination of the deliverable, may be defined in advance. For example, the storage destinations of the deliverables that are assumed to be created in the respective stages of the development process, are defined in advance by a system administrator.

The person in charge of development creates a deliverable corresponding to a storage destination defined in advance as the development process proceeds, and stores the deliverable in the storage destination. By repeating such an operation in the respective stages of the development process, it is possible to manage the deliverables, such that it is easily recognized that the deliverables needed for development are created without any omission.

Patent Document 1: Japanese Laid-Open Patent Publication No. 2002-182908
Patent Document 2: Japanese Laid-Open Patent Publication No. H8-292884
Patent Document 3: Japanese Laid-Open Patent Publication No. H3-46059

There are cases where the relationships between the storage destinations and the deliverables are set, in accordance with the connections between development operations and the connections between the components of the product. By setting relationships between the storage destinations and the deliverables, the following advantage is obtained. That is, when a problem arises in a certain component such as a failure, the range of impact and the factor of the failure are easily recognized by tracing along the connections set for the deliverable relevant to the component.

Conventionally, there is provided a method of tracing back along the connections one by one, starting from a certain data item of the deliverable, or a folder of the storage destination. This method is effective in confirming the connection with respect to a single deliverable or a single storage destination; however, it is inefficient for checking the connection between a certain data group or folder group and another data group or folder group.

SUMMARY

According to an aspect of the embodiments, a non-transitory computer-readable recording medium stores a management program that causes a computer to execute a process, the computer being configured to store connection information with respect to data items and folders that are management targets, the connection information including information identifying connection sources and connection destinations, the process including performing an analysis process based on the stored connection information with respect to a first data group or a first folder group or a first mixture group of data and folders, and a second data group or a second folder group or a second mixture group of data and folders, which are specified as output targets of information indicating connections; outputting first connection information as information indicating a connection between a first data item or a first folder included in the first data group or the first folder group or the first mixture group of data and folders, and a second data item or a second folder included in the second data group or the second folder group or the second mixture group of data and folders, when one or a plurality of data items or folders that are connection destinations are traced from the first data item or the first folder set as a connection source, and the second data item or the second folder is reached as a connection destination, by the analysis process; and outputting second connection information, which is different from the first connection information, as information indicating a connection between a third data item or a third folder included in the second data group or the second folder group or the second mixture group of data and folders, and a fourth data item or a fourth folder included in the first data group or the first folder group or the first mixture group of data and folders, when one or a plurality of data items or folders that are connection destinations are traced from the third data item or the third folder set as a connection source, and the fourth data item or the fourth folder is reached as a connection destination, by the analysis process.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 5 illustrates a configuration example of an object table stored in a data storage unit;

FIG. 6 illustrates an example of a connection table stored in the data storage unit;

DESCRIPTION OF EMBODIMENTS

Figure 1:
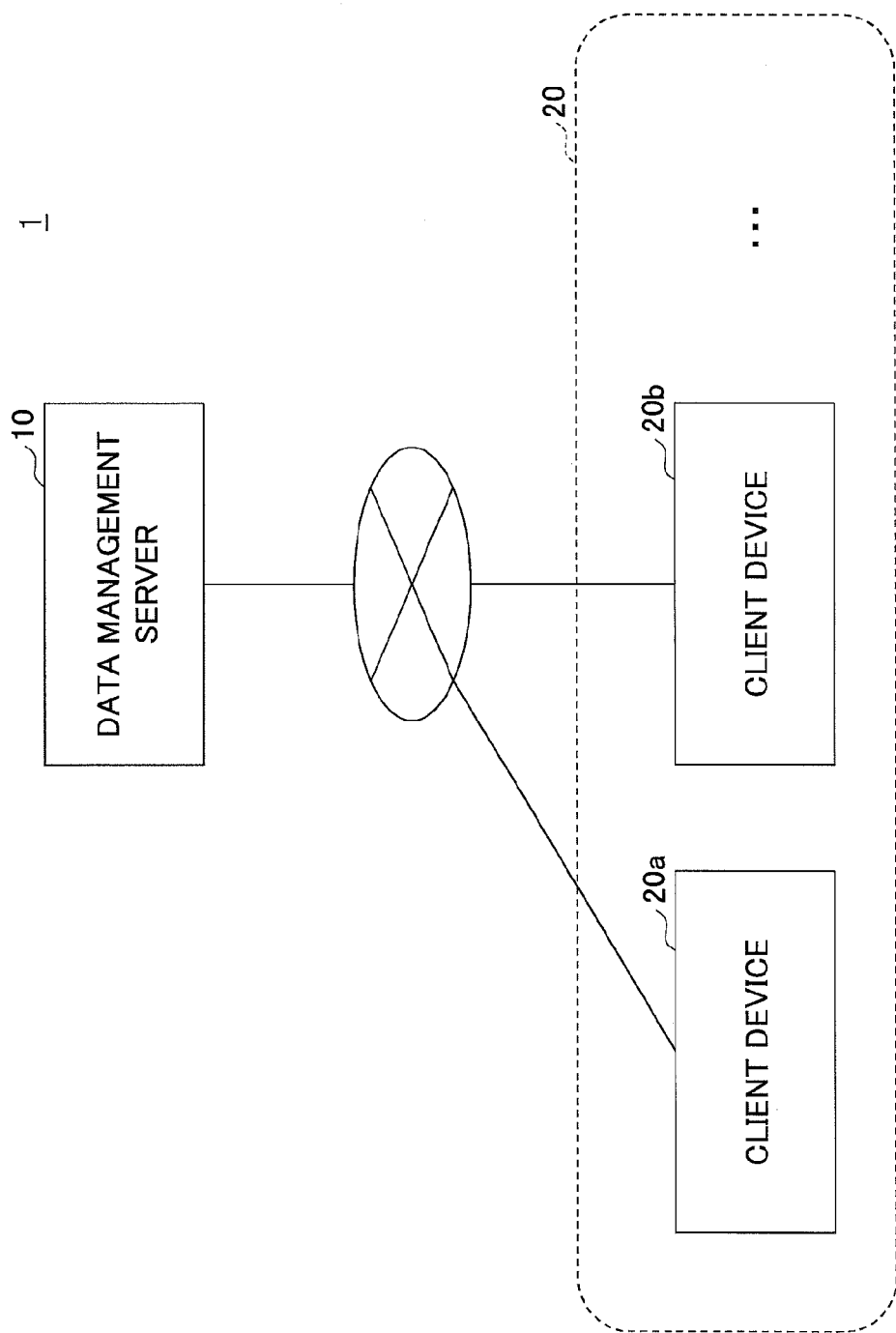
FIG. 1 illustrates a configuration example of a data management system according to an embodiment of the present invention.

Preferred embodiments of the present invention will be explained with reference to accompanying drawings. FIG. 1 illustrates a configuration example of a data management system according to an embodiment of the present invention. In a data management system 1 illustrated in FIG. 1, a data management server 10 and at least one client device 20 are connected to each other via a network such as LAN (Local Area Network) or the Internet such that communication is possible.

The data management server 10 is a computer for managing data. A plurality of computers may constitute the data management server 10. For example, the deliverable created by a development process of a product such as an electronic component of an automobile, is the data that is the management target. The deliverable may be, for example, document data, drawing data, or image data. However, the data that is the management target need not be limited to a particular type of data.

The client device 20 is a computer used for operating on the data managed by the data management server 10. A PC (Personal Computer), a tablet terminal, a smartphone, or a feature phone may be used as the client device 20.

Figure 2:
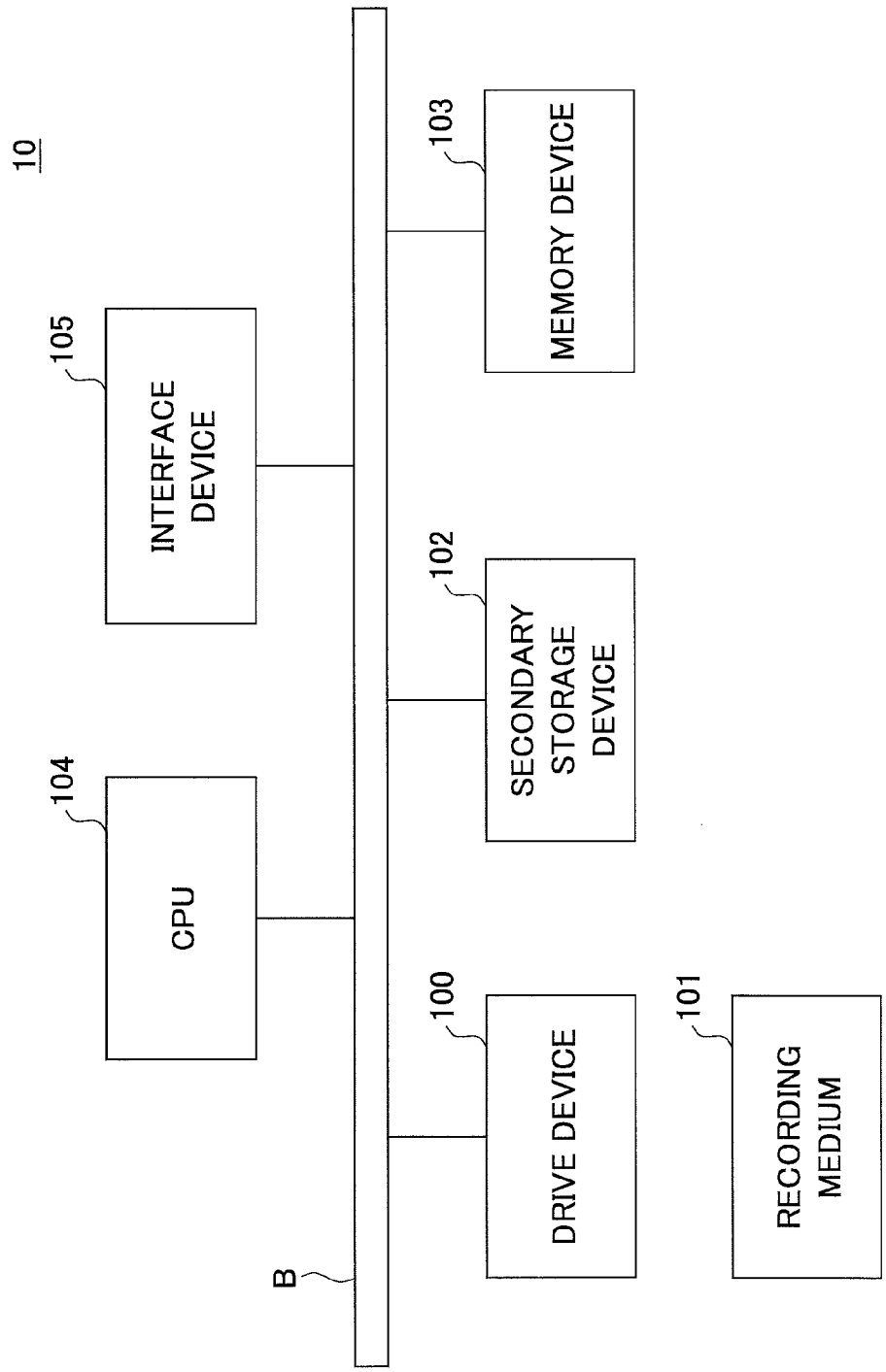
FIG. 2 illustrates an example of a hardware configuration of a data management server according to an embodiment of the present invention.

FIG. 2 illustrates an example of a hardware configuration of the data management server 10 according to an embodiment of the present invention. The data management server 10 illustrated in FIG. 2 includes a drive device 100, a secondary storage device 102, a memory device 103, a CPU 104, and an interface device 105, which are connected to each other via a bus B.

Programs for realizing processes at the data management server 10 are provided by a recording medium 101. When the recording medium 101 storing a program is set in the drive device 100, the program is installed in the secondary storage device 102 from the recording medium 101 via the drive device 100. However, a program need not be installed from the recording medium 101; a program may be downloaded from another computer via the network. The secondary storage device 102 stores the installed programs as well as files and data that are needed.

The memory device 103 reads a program from the secondary storage device 102 and stores the program, when an instruction to activate the program is given. The CPU 104 executes functions relevant to the data management server 10 according to programs stored in the memory device 103. The interface device 105 is used as an interface for connecting to the network.

Note that examples of the recording medium 101 are portable recording media such as a CD-ROM, a DVD disk, and a USB memory. Furthermore, examples of the secondary storage device 102 are HDD (Hard Disk Drive) and a flash memory. Both the recording medium 101 and the secondary storage device 102 correspond to a computer-readable recording medium.

Note that the data management server 10 may be a computer system including a plurality of computers. Furthermore, the client device 20 may also have hardware as illustrated in FIG. 2. Furthermore, the client device 20 may include an input device for receiving input from a user and a display device for displaying information to the user.

Figure 3:
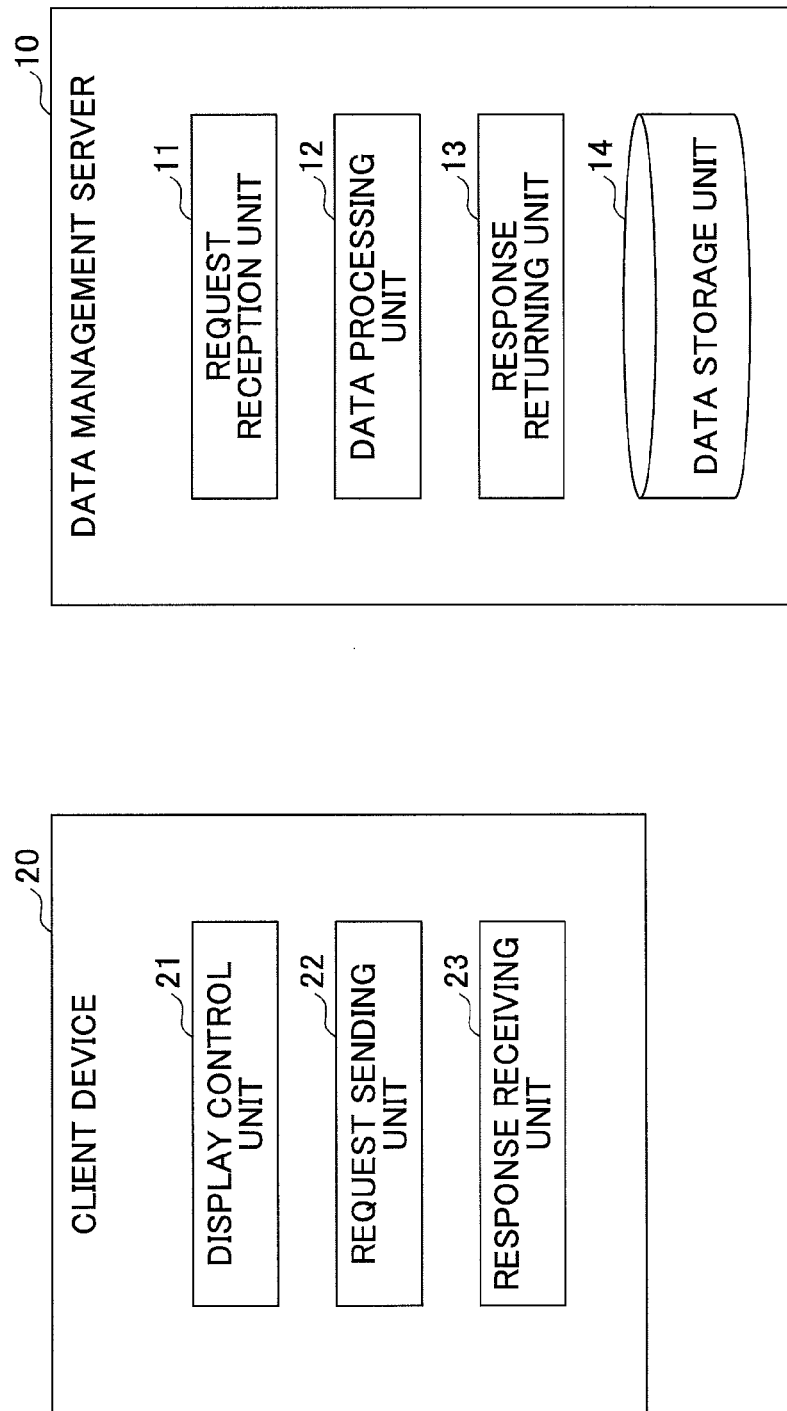
FIG. 3 illustrates an example of a functional configuration of the data management system according to an embodiment of the present invention.

FIG. 3 illustrates an example of a functional configuration of the data management system 1 according to an embodiment of the present invention. In FIG. 3, the data management server 10 includes a request reception unit 11, a data processing unit 12, and a response returning unit 13. These units are realized as one or more programs installed in the data management server 10 cause the CPU 104 to execute processes. The data management server 10 also includes a data storage unit 14. The data storage unit 14 may be realized by, for example, the secondary storage device 102 or a storage device connected to the data management server 10 via the network.

The request reception unit 11 receives a request to operate on data, from the client device 20. The data processing unit 12 executes a process according to the operation request received by the request reception unit 11, with respect to data stored in the data storage unit 14. The response returning unit 13 returns the execution results of the process executed by the data processing unit 12, to the client device 20.

The client device 20 includes a display control unit 21, a request sending unit 22, and a response receiving unit 23. The display control unit 21 displays, on a display device, a screen for receiving an instruction to operate on data that is the management target. The request sending unit 22 sends, to the data management server 10, an operation request according to the operation instruction input via the screen displayed by the display control unit 21. The response receiving unit 23 receives a response returned from the data management server 10, according to the operation request sent by the request sending unit 22. The information included in the response is displayed by the display control unit 21.

Figure 4:
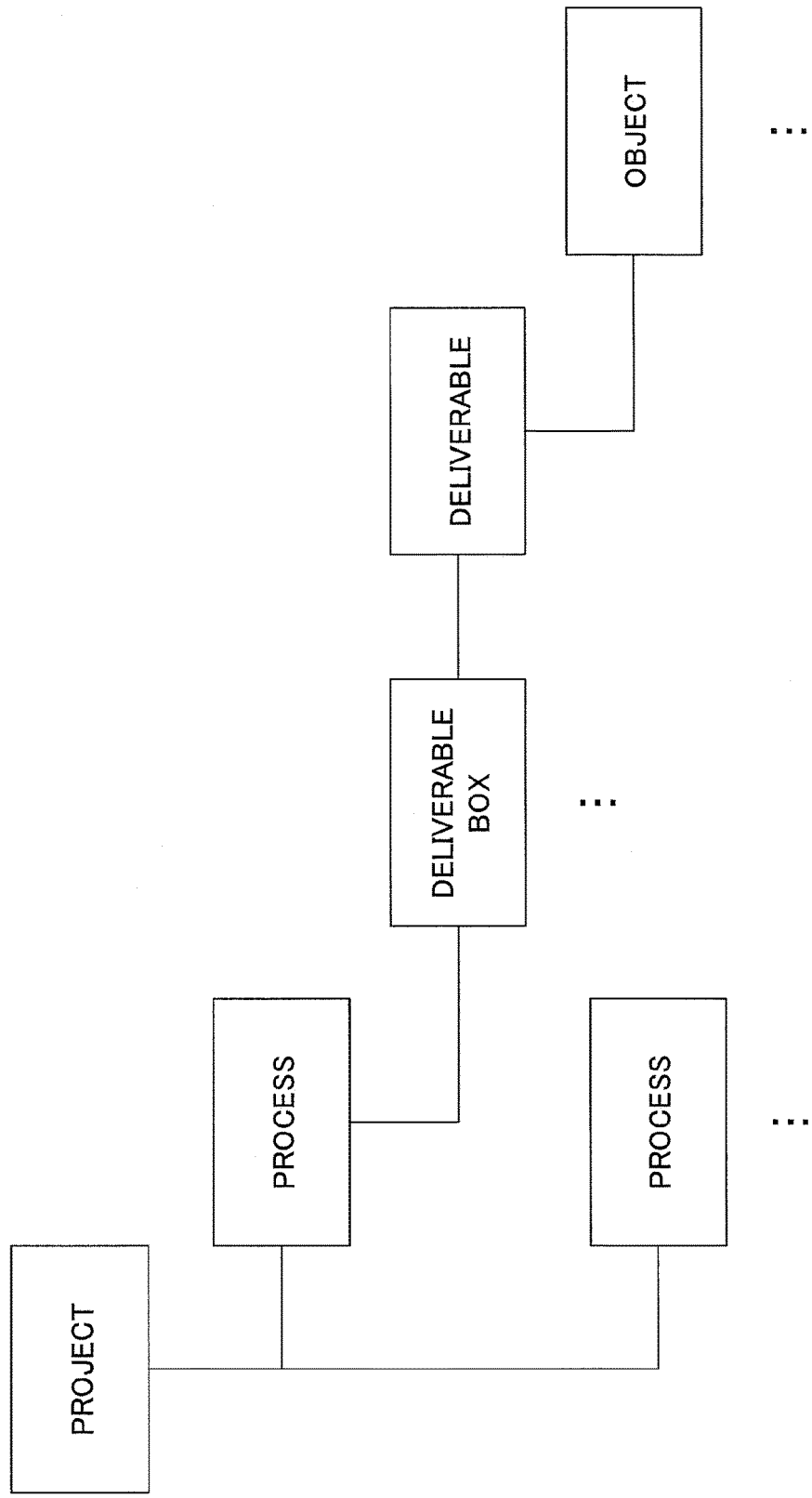
FIG. 4 illustrates a management system of data according to an embodiment of the present invention.

Next, a description is given of the management system of data that is the management target, according to the present embodiment. FIG. 4 illustrates a management system of data according to the present embodiment.

In FIG. 4, a project is a concept corresponding to a single product that is the development target. One or more processes belong to the project. A process is a concept corresponding to each stage of the development process of the product. One or more deliverable boxes belong to each process. The deliverable box is a concept expressing a box for storing the deliverable. Therefore, a deliverable belongs to a deliverable box. In the present embodiment, one deliverable box is prepared for each deliverable. That is to say, one deliverable may be stored in each deliverable box. However, a plurality of deliverables may be stored in a single deliverable box.

As described above, in the present embodiment, the storage destination of the deliverable is expressed by using a hierarchal structure constituted by a project, processes, and deliverable boxes. This hierarchal structure is referred to as a parent and child relationship. Note that data expressing a project, a process, a deliverable box, and a deliverable, is managed as records of a database in the data storage unit 14. For example, when a RDB (Relational Database) is used, a project is managed as records of a table (hereinafter, "project table") having a format for a project. A process is managed as records of a table (hereinafter, "process table") having a format for a process. A deliverable box is managed as a record of a table (hereinafter, "deliverable box table") having a format for a deliverable box. A deliverable is managed as a record of a table (hereinafter, "deliverable table") having a format for a deliverable.

Furthermore, in FIG. 4, an object is indicated as data belonging to a lower layer of the deliverable. An object is an element of a deliverable, which is extracted from the deliverable, in response to a user's instruction. For example, when the deliverable is a requirement definition document, each requirement is extracted as one object. The data expressing an object is managed as a record of a database, similar to other data. Specifically, the object is managed as a record of a table (hereinafter, "object table") having a format for an object.

For example, FIG. 5 illustrates a configuration example of an object table stored in the data storage unit 14.

In FIG. 5, the object table stores a record for each data item of an object. Each record includes items such as a project name, an object name, a deliverable name, and an object type. The project name is an identification name of a project to which the object belongs. The object name is an identification name of the object. The deliverable name is an identification name of the deliverable to which the object belongs. The object type is information indicating the type of object. That is to say, in the object, the type may be set according to its contents. Each record may include items corresponding to other attributes.

Note that the data items of the project, the process, the deliverable box, and the deliverable are also respectively managed by tables having a configuration similar to that of FIG. 5. However, in a project table, there is no need for the items of the project name, the deliverable name, and the object type; the item of the object name is replaced by a project name. Furthermore, in a process table, there is no need for the items of the deliverable name and the object type; the item of the object name is replaced by an identification name of a process (hereinafter, "process name"). Furthermore, in a deliverable box table, there is no need for the item of the object type; the item of the object name is replaced by an identification name of a deliverable box (hereinafter, "deliverable box name"). Furthermore, the item of the deliverable name is replaced by a process name of a process to which the deliverable box belongs. Furthermore, in a deliverable table, there is no need for the item of the object type; the item of the object name is replaced by a deliverable name. Furthermore, the item of the deliverable name is replaced by a deliverable box name of a deliverable box to which the deliverable belongs.

Alternatively, the record of each table may include, as information for identifying data to be stored in the record, data names of all data recursively tracing back to the parent of the corresponding data, in addition of the data name of the corresponding data. For example, in the case of a project table, the project name is included. In a process table, the project name and the process name are included. In a deliverable box table, the project name, the process name, and the deliverable box name are included. In a deliverable table, the project name, the process name, the deliverable box name, and the deliverable name are included.

In the present embodiment, "data" is a record of a project, a process, a deliverable box, a deliverable, and an object. Among these, the project, the process, and the deliverable box are data constituting the storage destination of the deliverable, and are thus expressed as a folder with respect to the user. That is to say, a project is expressed as a folder storing one or more processes. A process is expressed as a folder storing one or more deliverable boxes. A deliverable box is expressed as a folder storing one deliverable. Thus, in the present embodiment, a "folder" is used as a term meaning the highest conception of a project, a process, and a deliverable box.

Furthermore, in the present embodiment, the concept of distinguishing a project, a process, a deliverable box, a deliverable, and an object is referred to as a data type.

The parent and child relationship of the project, the process, the deliverable box, etc., is defined in advance by, for example, an administrator. The developer of a product creates a deliverable corresponding to the deliverable box as the development process proceeds, and registers the deliverable in the deliverable box. Accordingly, it is possible to manage the deliverables, such that it is easily recognized that the deliverables needed for development are created without any omission.

Between the respective data items, a connection may be set. One of the two data items connected by one connection is the connection source, and the other data item is the connection destination. That is to say, there is a direction in a connection. The direction from the connection source to the connection destination is hereinafter referred to as "forward direction". The direction from the connection destination to the connection source is hereinafter referred to as "backward direction".

The connection is also managed as a record of a table (hereinafter, "connection table") for managing connections in the data storage unit 14, similar to the data. A record of connection includes an identification name of the data of the connection source (hereinafter, "data name"), and the data name of the data of the connection destination. The data name is the highest conception of the project name, the process name, the deliverable box name, the deliverable name, and the object name. Note that in the present embodiment, as a matter of convenience, connection is not included in the concept of "data".

FIG. 6 illustrates an example of a connection table stored in the data storage unit 14. The connection table illustrated in FIG. 6 includes items such as the connection source, the connection destination, an attribute 1, and an attribute 2, for each connection. The connection source is the data name of the data that is the connection source. The connection destination is the data name of the data of the connection destination. The attribute 1 and the attribute 2 are examples of attributes of connection. By the connection table, it is possible to identify the connection source and the connection destination, with respect to the connection between data items.

Note that the connection source and the connection destination of each record illustrated in FIG. 6 are both object names. That is to say, the record illustrated in FIG. 6 is a record for managing the connection between objects. However, the connection may be set between data items belonging to data types other than an object. For example, a connection may be set between processes. Furthermore, the connection may be set across different data types. For example, a connection may be set between a process and a deliverable.

Figure 7:
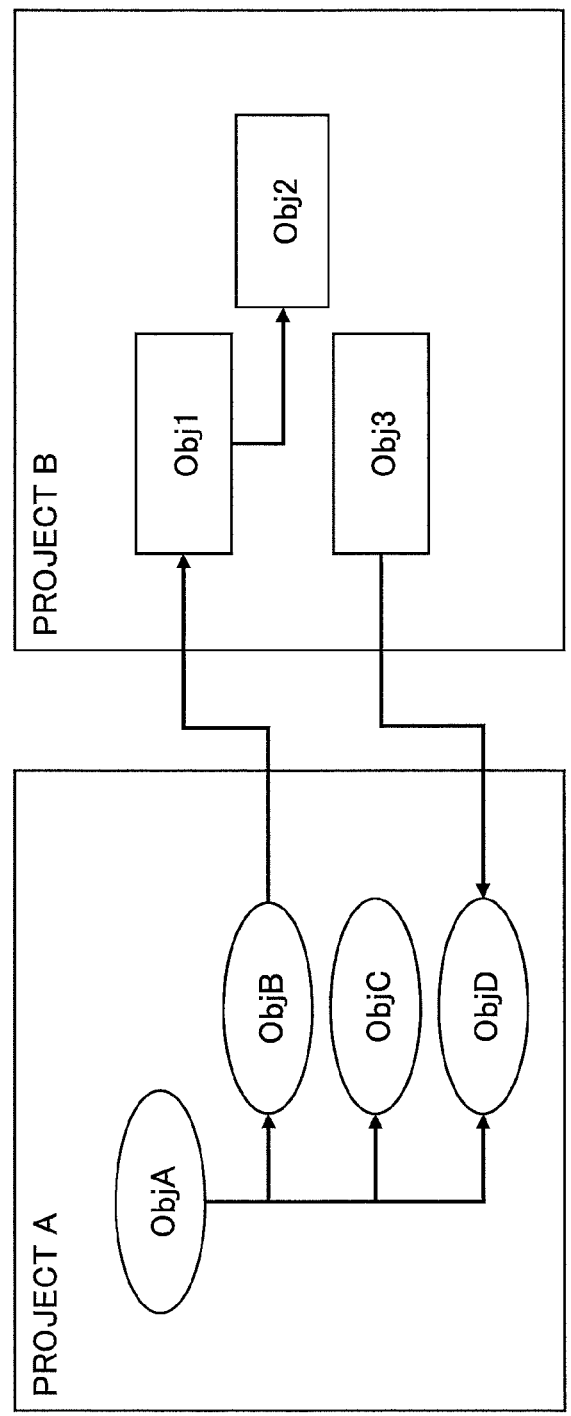
FIG. 7 illustrates the connection between objects according to an embodiment of the present invention.

Note that the connection indicated by the object table of FIG. 5 and the connection table of FIG. 6 is visually indicated in FIG. 7.

FIG. 7 illustrates the connection between objects according to an embodiment of the present invention. In FIG. 7, when the type of an object is "type 1", the object is indicated by an oval. When the type of an object is "type 3", the object is indicated by a rectangle. The connection between objects is indicated by an arrow. The object at the source of the arrow is the connection source, and the object at the point of the arrow is the connection destination.

Note that the connection between data and the parent and child relationship constituting the hierarchal structure of FIG. 4 are different concepts, and are managed in different formats in terms of data management. For example, the parent and child relationship between a deliverable and an object is managed by a "deliverable name" item in the object table. Meanwhile, the connection between data is managed by the connection table. The connection between data may be arbitrarily set across the parent and child relationship of data.

In the present embodiment, in response to a request from the client device 20, the data management server 10 executes analysis of the connection between a certain data group and another data group.

Figure 8:
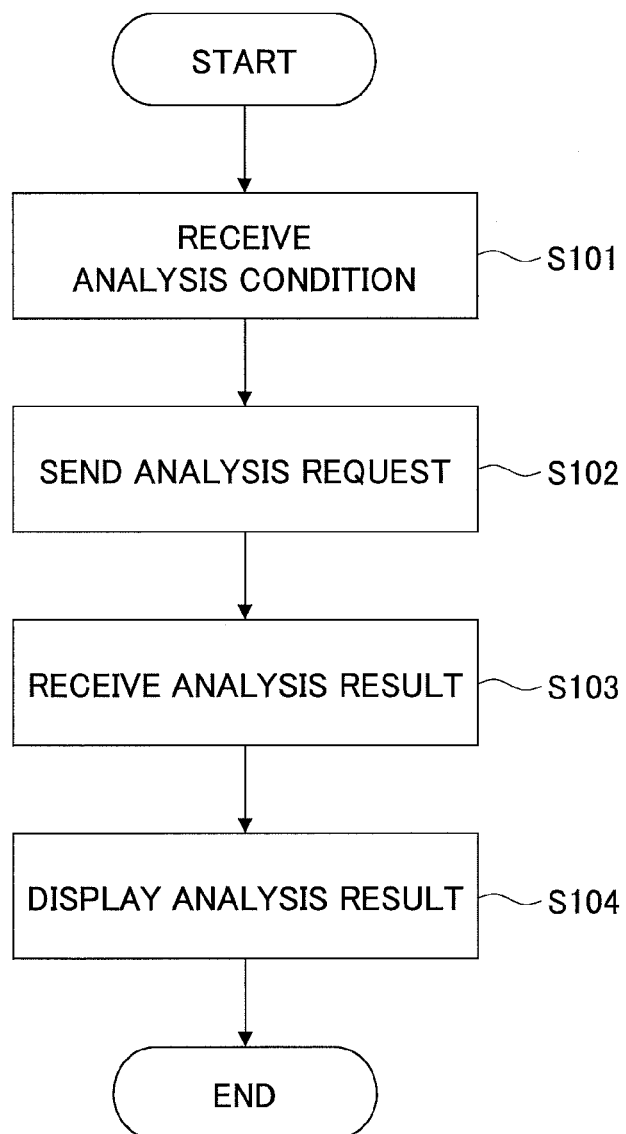
FIG. 8 is a flowchart for describing an example of processing procedures executed by a client device.

In the following, a description is given of processing procedures that are executed in the data management system 1. FIG. 8 is a flowchart for describing an example of processing procedures executed by the client device 20.

In step S101, the display control unit 21 receives a setting of analysis conditions from the user, via an analysis condition input screen.

Figure 9:
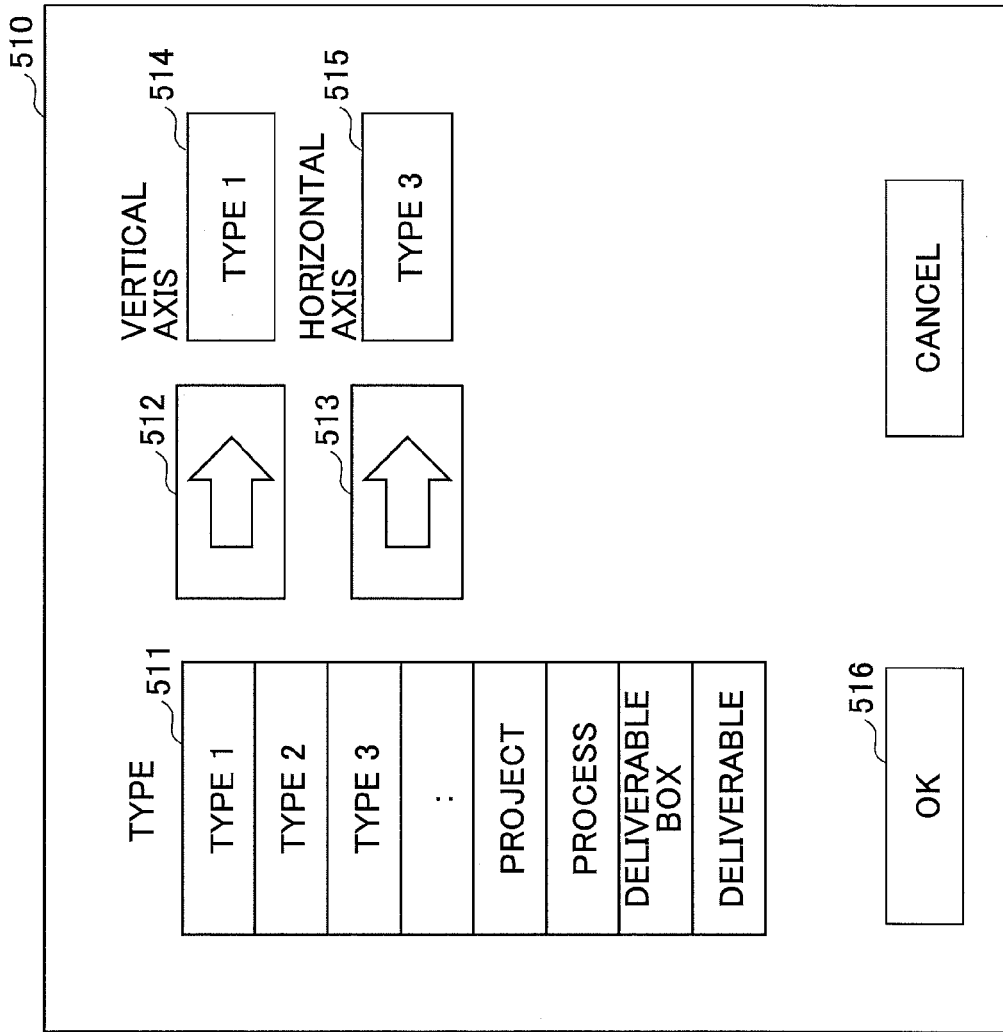
FIG. 9 illustrates a display example of an analysis condition input screen.

FIG. 9 illustrates a display example of an analysis condition input screen. In FIG. 9, an analysis condition input screen 510 includes a type selection area 511, a button 512, a button 513, a vertical axis type display area 514, a horizontal axis type display area 515, and an OK button 516.

The type selection area 511 displays a list of data types as options. However, as for objects, options are displayed for each object type. In the type selection area 511, when the button 512 is pressed in a state where any one of the options is selected, the data type or object type relevant to the option being selected is displayed in the vertical axis type display area 514. In the type selection area 511, when the button 513 is pressed in a state where any one of the options is selected, the data type or object type relevant to the option being selected is displayed in the horizontal axis type display area 515. Note that the meanings of vertical axis and horizontal axis are described below. In the analysis condition input screen 510, the data type or object type arranged along the vertical axis, and the data type or object type arranged along the horizontal axis, are selected as parameters constituting the analysis conditions. Note that the same data type or object type may be selected for both the vertical axis and the horizontal axis.

The data type or object type selected for the vertical axis is hereinafter referred to as a "vertical axis type". Furthermore, the data type or object type selected for the horizontal axis is hereinafter referred to as a "horizontal axis type". The vertical axis type and the horizontal axis type are information specifying a data group that is the analysis target of connection and the display target of analysis results. The example of FIG. 9 illustrates a case where one of the object types "type 1" is selected as the vertical axis type, and another one of the object types "type 3" is selected as the horizontal axis type.

When the OK button 516 is pressed after both the vertical axis type and the horizontal axis type are selected, the request sending unit 22 sends an analysis request including the vertical axis type and the horizontal axis type, to the data management server 10 (step S102). In response to this analysis request, the data processing unit 12 of the data management server 10 executes an analysis process with respect to the connection between a group of data belonging to the vertical axis type and a group of data belonging to the horizontal axis type. Details of the analysis process are described below.

Next, the response receiving unit 23 receives information indicating the analysis results obtained by the data processing unit 12 (step S103). Next, the display control unit 21 causes the display device to display an analysis result output screen including information indicating the analysis results (step S104).

Figure 10:
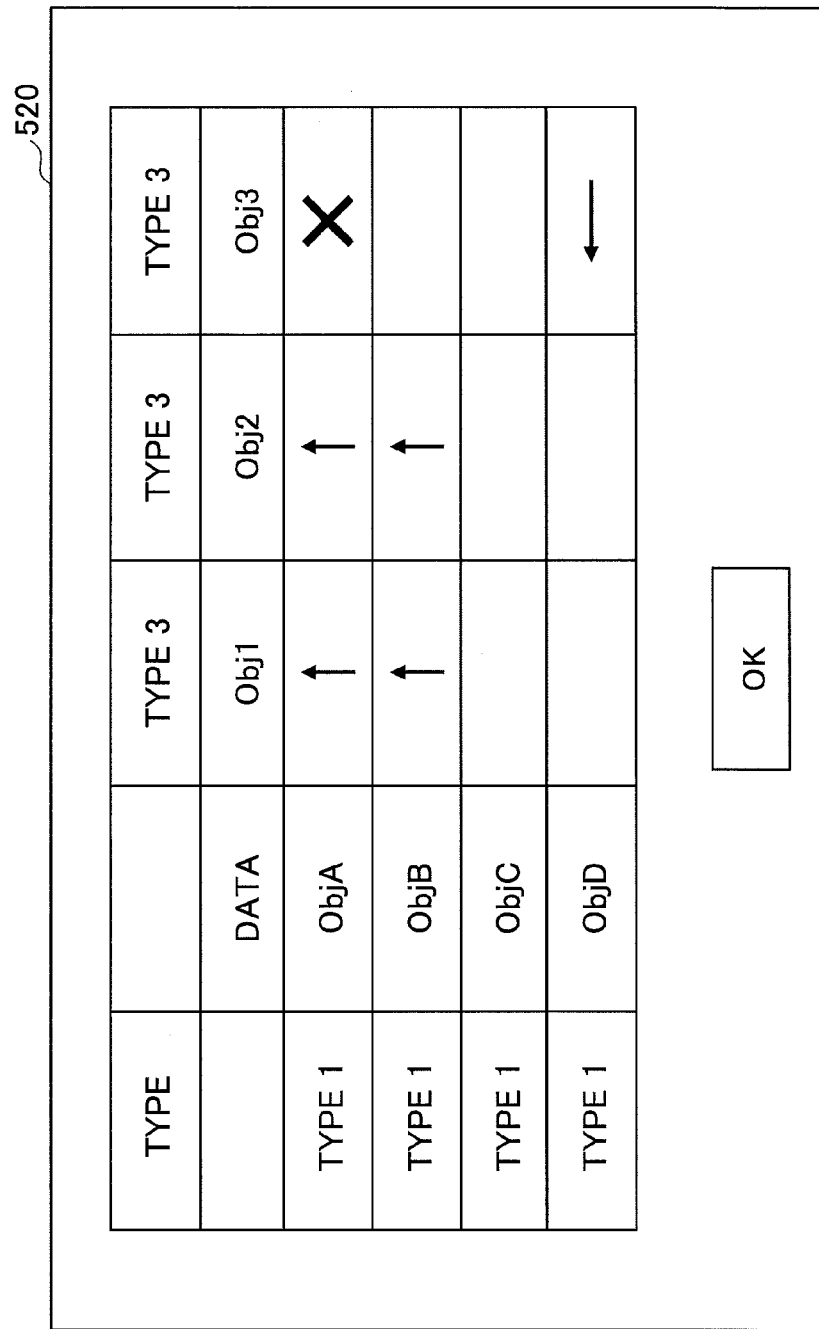
FIG. 10 is a display example of an analysis result output screen.

FIG. 10 is a display example of an analysis result output screen. In FIG. 10, an analysis result output screen 520 includes a table indicating a matrix including four rows and three columns, in which four data items belonging to the vertical axis type are arranged in the line direction (vertical axis direction), and three data items belonging to the horizontal axis type are arranged in the row direction (horizontal axis direction). The elements of the matrix are "↑", "←", "x", or a blank space.

"↑" indicates that there is a direct or indirect connection, in which the data arranged in the line of the element is the connection source, and the data arranged in the row of the element is the connection destination. A direct connection means a state where two data items are connected by one connection. An indirect connection means that two data items are connected by a plurality of connections. That is to say, "↑" indicates that by tracing along one or more connections in the forward direction from the data arranged in the line of the element, it is possible to arrive at (reach) the data arranged in the row of the element.

"←" indicates that there is a direct or indirect connection, in which the data arranged in the row of the element is the connection source, and the data arranged in the line of the element is the connection destination. That is to say, "←" indicates that by tracing along one or more connections in the forward direction from the data arranged in the row of the element, it is possible to arrive at (reach) the data arranged in the line of the element. Alternatively, "←" may indicate that there is a direct or indirect connection, in which the data arranged in the line of the element is the connection destination, and the data arranged in the row of the element is the connection source. That is to say, "←" indicates that by tracing along one or more connections in the backward direction (i.e., by tracing back along the connections) from the data arranged in the line of the element, it is possible to arrive at (reach) the data arranged in the row of the element.

"x" indicates that by tracing along the connections in either the forward direction or the backward direction from the data arranged in the line of the element, it is not possible to arrive at the data arranged in the row of the element, but by tracing along the connections in directions including a mixture of the forward direction and the backward direction, it is possible to arrive at the data arranged in the row of the element.

A blank space indicates that none of "↑", "←", or "x" apply. That is to say, a blank space indicates that there is no connection between the data arranged in the line of the element and the data arranged in the row of the element.

With reference to FIG. 7, a specific description is given of the connection between objects indicated by the elements of "↑", "←", and "x" in FIG. 10. The element of "↑" indicating the connection between ObjA and Obj1 in FIG. 10, is based on the connections in the forward direction constituted by ObjA→ObjB→Obj1 in FIG. 7. The element of "↑" indicating the connection between ObjA and Obj2 in FIG. 10, is based on the connections in the forward direction constituted by ObjA→ObjB→Obj1→Obj2 in FIG. 7. The element of "x" indicating the connection between ObjA and Obj3 in FIG. 10, is based on the connections including both the forward direction and the backward direction constituted by ObjA→ObjD←Obj3 in FIG. 7.

The element of "↑" indicating the connection between ObjB and Obj1 in FIG. 10, is based on the connection constituted by ObjB→Obj1 in FIG. 7. The element of "↑" indicating the connection between ObjB and Obj2 in FIG. 10, is based on the connections constituted by ObjB→Obj1→Obj2 in FIG. 7.

The element of "←" indicating the connection between ObjD and Obj3 in FIG. 10, is based on the connection in the backward constituted by ObjD←Obj3 in FIG. 7.

As described above, according to the analysis result output screen 520 illustrated in FIG. 10, the user may intuitively and visually recognize the connection between the data constituting the group of data belonging to the vertical axis type and the data constituting the group of data belonging to the horizontal axis type. As a result, for example, the user may easily recognize a failure and the range of the impact of a failure of a component corresponding to certain data. Furthermore, the user may easily detect that a connection, which is not supposed to be allowed, is set. For example, in a case where the setting of a connection corresponding to "x" is not allowed, the user may revise the setting relevant to the connection.

Figure 11:
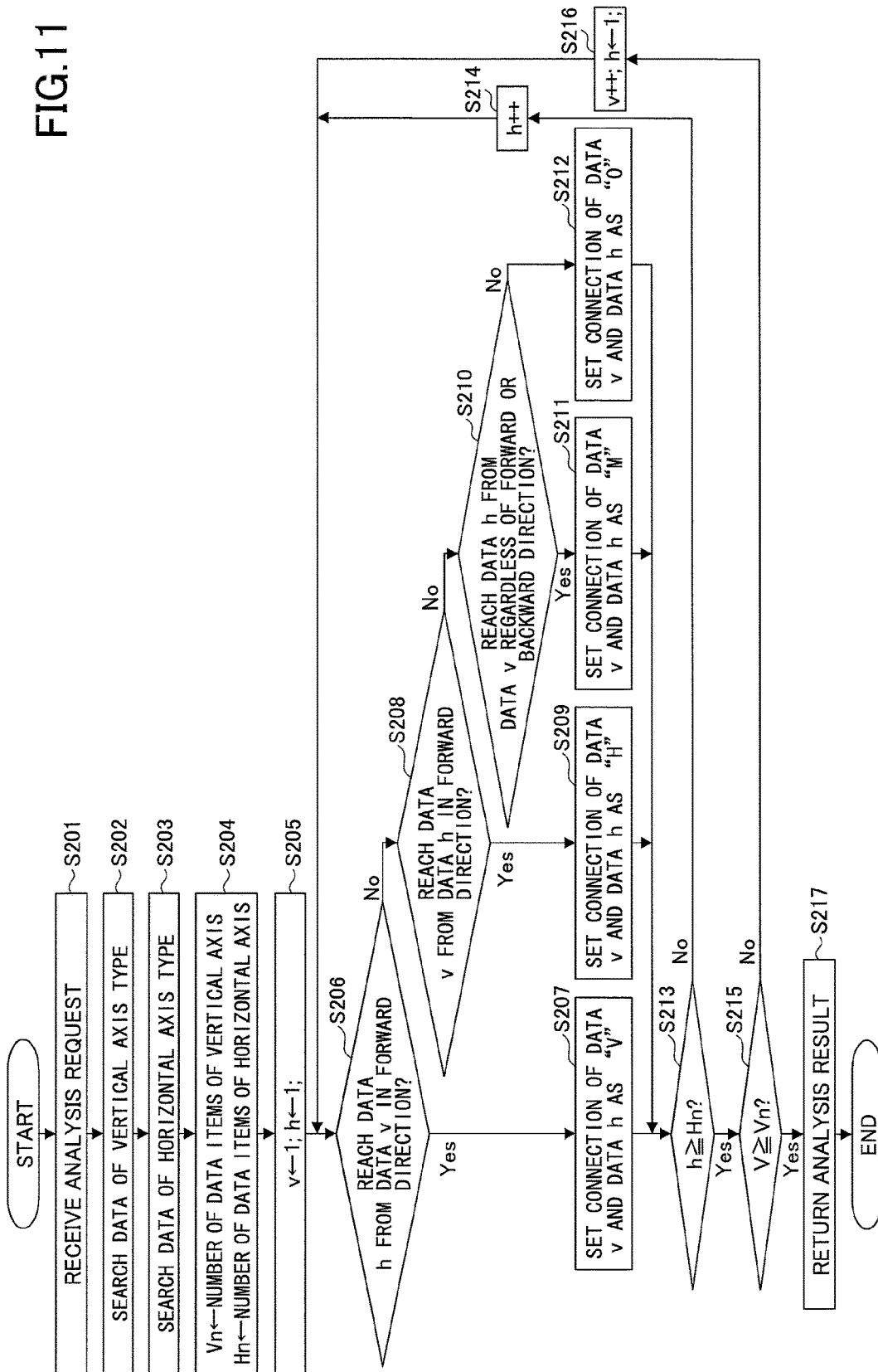
FIG. 11 is a flowchart for describing an example of processing procedures executed by the data management server.

Next, a description is given of processing procedures executed by the data management server 10. FIG. 11 is a flowchart for describing an example of processing procedures executed by the data management server 10.

In step S201, the request reception unit 11 receives an analysis request sent in step S102. Next, the data processing unit 12 searches, the data storage unit 14, for data belonging to the vertical axis type included in the analysis request (step S202). When the vertical axis type indicates the data type, the data processing unit 12 searches all records of the table corresponding to the data type. When the vertical axis type indicates the object type, the data processing unit 12 searches records whose object type matches the vertical axis type, in an object table.

Next, the data processing unit 12 searches the data storage unit 14 for data belonging to the horizontal axis type included in the analysis request (step S203). The method of searching for data belonging to the horizontal axis type may be the same as the method of searching for data belonging to the vertical axis type.

Next, the data processing unit 12 assigns, in a variable Vn, the number of data items found by the search in step S202, and assigns, in a variable Hn, the number of data items found by the search in step S203 (step S204).

Next, the data processing unit 12 assigns 1 to a variable v and to a variable h, respectively (step S205). The variable v is for identifying the data that is the processing target in the group of data belonging to the vertical axis type. The variable h is for identifying the data that is the processing target in the group of data belonging to the horizontal axis type. In the following, the with data item in the group of data belonging to the vertical axis type is referred to "data v". Furthermore, the hth data item in the group of data belonging to the horizontal axis type is referred to "data h".

Next, the data processing unit 12 refers to the connection table (FIG. 6), and determines whether it is possible to reach the data h, by tracing along one or more connections in the forward direction, from the data v that is the connection source (step S206). When it is possible to reach the data h (YES in step S206), the data processing unit 12 stores "V" as information indicating the connection between data v and data h. The storage destination of this information is, for example, the memory device 103 or the secondary storage device 102. "V" corresponds to "↑" in FIG. 10. That is to say, the display control unit 21 replaces "V" with "↑" and displays "↑". However, "V" may be displayed without being replaced.

Note that whether it is possible to reach data h by referring to the connection table and tracing along one or more connections in the forward direction, from the data v that is the connection source, may be determined as follows, for example.

(1) Search the connection table for a record including data v as the connection source.
(2) Search the connection table for a record including, as the connection source, the connection destination of the record found as a result of the search.
(3) Recursively repeat (2) with respect to the record found as a result of the search. When a record including data h as the connection destination is found before there are no more records to be searched, it means that data h is reached. When there are no more records to be searched without finding a corresponding record, it means that data h is not reached.

When data h is not reached (NO in step S206), the data processing unit 12 refers to the connection table, and determines whether it is possible to reach the data v, by tracing along one or more connections the forward direction, from the data h that is the connection source (step S208). That is to say, it is determined whether there is a connection in the direction opposite to the connection found as a result of the search in step S206.

When data v is reached (YES in step S208), the data processing unit 12 stores "H", which is different from "V", as information indicating the connection between data v and data h. "H" corresponds to "←" in FIG. 10. That is to say, the display control unit 21 replaces "H" with "←" and displays "←". However, "H" may be displayed without being replaced. Note that the determination method in step S208 may be performed by, for example, (1) through (3) described with reference to step S206 except that data v and data h are replaced with each other.

When data v is not reached (NO in step S208), the data processing unit 12 refers to the connection table, and determines whether it is possible to reach the data h, by tracing along one or more connections in either the forward direction or the backward direction, from the data v that is the connection source or the connection destination (step S210). When data h is reached (YES in step S210), the data processing unit 12 stores "M", which is different from "V" or "H", as information indicating the connection between data v and data h. "M" corresponds to "x" in FIG. 10. That is to say, the display control unit 21 replaces "M" with "x" and displays "x". However, "M" may be displayed without being replaced.

Note that whether it is possible to reach data h by referring to the connection table illustrated in FIG. 6 and tracing along one or more connections in either the forward direction or the backward direction, from the data v that is the connection source or the connection destination, may be determined as follows, for example.

(1) Search the connection table for a record including data v as the connection source or the connection destination.
(2) Search the connection table for a record including, as connection source or the connection destination, the connection source or the connection destination of the record found as a result of the search.
(3) Recursively repeat (2) with respect to the record found as a result of the search. When a record including data h as the connection source or the connection destination is found before there are no more records to be searched, it means that data h is reached. When there are no more records to be searched without finding a corresponding record, it means that data h is not reached.

When data h is not reached (NO in step S210), the data processing unit 12 stores "0" as the analysis result with respect to data v and data h. "0" corresponds to a blank space in FIG. 10. That is to say, the display control unit 21 replaces the analysis result "0" with a blank space. However, "0" may be displayed without being replaced.

After any one of steps S207, S209, S211, S212, the data processing unit 12 determines whether the value of a variable h is greater than or equal to a variable Hn (step S213). That is to say, the data processing unit 12 determines, with respect to data v, whether analysis of connections has been performed for all data belonging to the horizontal axis type. When the value of the variable h is less than the variable Hn (NO in step S213), the data processing unit 12 increments the variable h by one (step S214), and repeats step S206 and onward. That is to say, the connection with the data v is analyzed for the next data item belonging to the horizontal axis type.

When the value of the variable h is greater than or equal to the variable Hn (YES in step S213), the data processing unit 12 determines whether the value of the variable v is greater than or equal to the variable Vn (step S215). That is to say, the data processing unit 12 determines, with respect to data v, whether analysis of connections has been performed for all data belonging to the vertical axis type. When the value of the variable v is less than the variable Vn (NO in step S215), the data processing unit 12 increments the variable v by one, assigns one in the variable h (step S216), and repeats step S206 and onward. That is to say, the connection with all of the data belonging to the horizontal axis type is analyzed for the next data item belonging to the vertical axis type.

When the value of the variable v is greater than or equal to the variable Vn (YES in step S215), the response returning unit 13 returns the stored analysis results to the client device 20 (step S217). That is to say, the response returning unit 13 outputs the analysis results. However, the destination to which the analysis results are sent may be, for example, a mail address specified in the analysis request. That is to say, the analysis results may be sent by e-mail. In this case, the analysis results are generated as, for example, the table format data indicating a matrix as illustrated in FIG. 10, and the table format data may be attached to the e-mail. Alternatively, the e-mail may include a URL (Uniform Resource Locator) by which the analysis may be referred to, and a web page indicating the analysis results may be returned in response to a request to the URL.

Note that in the above description, as a matter of convenience, specific examples are given of the connection between objects; however, as for the connection between data belonging to other data types, the analysis may be performed by the same processing procedures as above. Therefore, in the present embodiment, the connection may be analyzed for data that is classified into folders of projects, processes, and deliverable boxes.

As described above, according to the present embodiment, with respect to a certain data group or folder group or a mixture group of data and folders, and another data group or folder group or a mixture group of data and folders, it is possible to automatically analyze and output the connection between data items or between folders or between each data item and each folder. Therefore, efficiency is increased with respect to the checking of connections between a certain data group or a folder group and another data group or folder group.

Note that the scope to which the present embodiment is applicable is not limited to the data group or folder group managed in the management format as illustrated in FIG. 4. For example, in a management format of a typical file system, if it is possible to set the connection between files or folders, the present embodiment may be applied to the file group or folder group.

Furthermore, in the present embodiment, a description is given of an example in which the group of data arranged along the vertical axis (line direction) and the group of data arranged along the horizontal axis (row direction) are selected in units of the data type or object type. However, for example, it may be possible to select data or folders arranged along the vertical axis and data or folders arranged along the horizontal axis, one by one, in units of data or in units of folders. That is to say, the method of selecting a data group or a folder group arranged along the vertical axis and a data group or a folder group arranged along the horizontal axis, is not limited to a predetermined method.

Furthermore, the analysis condition input screen 510 and the analysis result output screen 520 may be generated by the response returning unit 13 by using, for example, HTML (HyperText Markup Language). In this case, the client device 20 is to have a versatile web browser.

Alternatively, the functions of the data processing unit 12 may be included in each client device 20. That is to say, the processing procedures illustrated in FIG. 11 may be executed by the client device 20. In this case, each client device 20 may search for data from the data management server 10 via the network.

Note that in the present embodiment, the data management server 10 is an example of a management system. The data processing unit 12 is an example of an analysis unit. The response returning unit 13 or the display control unit 21 is an example of an output unit. The connection table is an example of connection information. "V" or "↑" that is an example of connection information, is an example of first connection information. "H" or "←" is an example of second connection information. "M" or "x" is an example of third connection information.

The present invention is not limited to the specific embodiments described herein, and variations and modifications may be made without departing from the scope of the present invention.

According to an aspect of the embodiments, it is possible to increase the efficiency in checking the connection between a certain data group or folder group and another data group or folder group.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a management program that causes a computer to execute a process, the computer being configured to store connection information with respect to objects and folders representing a hierarchical location, the objects and the folders being management targets maintained in hierarchical structure, the connection information including information identifying connection sources and connection destinations, the process comprising:

performing an analysis process based on the stored connection information with respect to a first group indicating a first object group or a first folder group at a first hierarchical location or a first mixture group of objects and folders at the first hierarchical location, and a second group indicating a second object group or a second folder group at a second hierarchical location or a second mixture group of objects and folders at the second hierarchical location, which are specified as output targets of information indicating connections;

determining, as a forward direction, a connection between management targets in a combination, for each combination of a first management target reaching to one second management target and the one second management target to which the first management target reaches, upon reaching the one second management target that is either one of the object or the folder included in the second group as a connection destination by the analysis process, in which one or a plurality of objects or folders that are connection destinations are traced from each of one or more first management targets being the object or the folder included in the first group set as a connection source;

determining, as a backward direction, a connection between management targets in a combination, for each combination of a third management target reaching to one fourth management target and the one fourth management target to which the third management target reaches, upon reaching the one fourth management target that is either one of the object or the folder included in the first group as a connection destination by the analysis process, in which one or a plurality of objects or folders that are connection destinations are traced from each of one or more third management targets being the object or the folder included in the second group set as a connection source;

determining, as a mixture of the forward direction and the backward direction, a connection between a fifth management target that is either one of the object or the folder included in the first object group or the first folder group or the first mixture group of object and folders, and a sixth management target that is either one of the object or the folder included in the second object group or the second folder group or the second mixture group of object and folders; and displaying, at a display device, a matrix of the first group and the second group indicated as output targets, the matrix indicating each connection by the determined forward direction, the determined backward direction, or the mixed direction.

2. The non-transitory computer-readable recording medium according to claim 1, the process further comprising:

upon reaching the sixth management target as being connected to the fifth management target by the analysis process, in which one or a plurality of folders, which may be either connection destinations or connection sources of the fifth management target, are traced, but the sixth management target is unreached by tracing one or a plurality of folders that are connection destinations of the fifth management target, and the sixth management target is unreached by tracing one or a plurality of folders that are connection sources of the fifth management target.

3. A management method executed by a computer configured to store connection information with respect to objects and folders representing a hierarchical location, the objects and the folders being management targets maintained in hierarchical structure, the connection information including information identifying connection sources and connection destinations, the management method comprising:

performing an analysis process based on the stored connection information with respect to a first group indicating a first object group or a first folder group at a first hierarchical location or a first mixture group of objects and folders at the first hierarchical location, and a second group indicating a second object group or a second folder group at a second hierarchical location or a second mixture group of objects and folders at the second hierarchical location, which are specified as output targets of information indicating connections;

determining, as a forward direction, a connection between management targets in a combination, for each combination of a first management target reaching to one second management target and the one second management target to which the first management target reaches, upon reaching the one second management target that is either one of the object or the folder included in the second group as a connection destination by the analysis process, in which one or a plurality of objects or folders that are connection destinations are traced from each of one or more first management targets being the object or the folder included in the first group set as a connection source;

determining, as a backward direction, a connection between management targets in a combination, for each combination of a third management target reaching to one fourth management target and the one fourth management target to which the third management target reaches, upon reaching the one fourth management target that is either one of the object or the folder included in the first group as a connection destination by the analysis process, in which one or a plurality of objects or folders that are connection destinations are traced from each of one or more third management targets being the object or the folder included in the second group set as a connection source;

determining, as a mixture of the forward direction and the backward direction, a connection between a fifth management target that is either one of the object or the folder included in the first object group or the first folder group or the first mixture group of object and folders, and a sixth management target that is either one of the object or the folder included in the second object group or the second folder group or the second mixture group of object and folders; and displaying, at a display device, a matrix of the first group and the second group indicated as output targets, the matrix indicating each connection by the determined forward direction, the determined backward direction, or the mixed direction.

4. The management method according to claim 3, further comprising:

upon reaching the sixth management target as being connected to the fifth management target by the analysis process, in which one or a plurality of folders, which may be either connection destinations or connection sources of the fifth management target, are traced, but the sixth management target is unreached by tracing one or a plurality of folders that are connection destinations of the fifth management target, and the sixth management target is unreached by tracing one or a plurality of folders that are only connection sources of the fifth management target.

5. A management device configured to store connection information with respect to objects and folders representing a hierarchical location, the objects and the folders being management targets maintained in hierarchical structure, the connection information including information identifying connection sources and connection destinations, the management device comprising:

a processor configured to execute a process including performing an analysis process based on the stored connection information with respect to a first group indicating a first object group or a first folder group at a first hierarchical location or a first mixture group of objects and folders at the first hierarchical location, and a second group indicating a second object group or a second folder group at a second hierarchical location or a second mixture group of objects and folders at the second hierarchical location, which are specified as output targets of information indicating connections, determining, as a forward direction, a connection between management targets in a combination, for each combination of a first management target reaching to one second management target and the one second management target to which the first management target reaches, upon reaching the one second management target that is either one of the object or the folder included in the second group as a connection destination by the analysis process, in which one or a plurality of objects or folders that are connection destinations are traced from each of one or more first management targets being the object or the folder included in the first group set as a connection source, determining, as a backward direction, a connection between management targets in a combination, for each combination of a third management target reaching to one fourth management target and the one fourth management target to which the third management target reaches, upon reaching the one fourth management target that is either one of the object or the folder included in the first group as a connection destination by the analysis process, in which one or a plurality of objects or folders that are connection destinations are traced from each of one or more third management targets being the object or the folder included in the second group set as a connection source, determining, as a mixture of the forward and the backward direction, a connection between a fifth management target that is either one of the object or the folder included in the first object group or the first folder group or the first mixture group of object and folders, and a sixth management target that is either one of the object or the folder included in the second object group or the second folder group or the second mixture group of object and folders, and displaying, at a display device, a matrix of the first group and the second group indicated as output targets, the matrix indicating each connection by the determined forward direction, the determined backward direction, or the mixed direction.

6. The management device according to claim 5, the process further comprising:

upon reaching the sixth management target as being connected to the fifth management target by the analysis process, in which one or a plurality of folders, which may be either connection destinations or connection sources of the fifth management target, are traced, but the sixth management target is unreached by tracing one or a plurality of folders that are only connection destinations of the fifth management target, and the sixth management target is unreached by tracing one or a plurality of folders that are only connection sources of the fifth management target.

7. A management system configured to store connection information with respect to objects and folders representing a hierarchical location, the objects and the folders being management targets maintained in hierarchical structure, the connection information including information identifying connection sources and connection destinations, the management system comprising:

a processor configured to execute a process including performing an analysis process based on the stored connection information with respect to a first group indicating a first object group or a first folder group at a first hierarchical location or a first mixture group of objects and folders at the first hierarchical location, and a second group indicating a second object group or a second folder group at a second hierarchical location or a second mixture group of objects and folders at the second hierarchical location, which are specified as output targets of information indicating connections, determining as a forward direction a connection between management targets in a combination, for each combination of a first management target reaching to one second management target and the one second management target to which the first management target reaches, upon reaching the one second management target that is either one of the object or the folder included in the second group as a connection destination by the analysis process, in which one or a plurality of objects or folders that are connection destinations are traced from each of one or more first management targets being the object or the folder included in the first group set as a connection source;

determining, as a backward direction, a connection between management targets in a combination, for each combination of a third management target reaching to one fourth management target and the one fourth management target to which the third management target reaches, upon reaching the one fourth management target that is either one of the object or the folder included in the first group as a connection destination by the analysis process, in which one or a plurality of objects or folders that are connection destinations are traced from each of one or more third management targets being the object or the folder included in the second group set as a connection source;

determining, as a mixture of the forward and the backward direction, a connection between a fifth management target that is either one of the object or the folder included in the first object group or the first folder group or the first mixture group of object and folders, and a sixth management target that is either one of the object or the folder included in the second object group or the second folder group or the second mixture group of object and folders; and displaying, at a display device, a matrix of the first group and the second group indicated as output targets, the matrix indicating each connection by the determined forward direction, the determined backward direction, or the mixed direction.

8. The management system according to claim 7, the process further comprising:

upon reaching the sixth management target as being connected to the fifth management target by the analysis process, in which one or a plurality of folders, which may be either connection destinations or connection sources of the fifth management target, are traced, but the sixth management target is unreached by tracing one or a plurality of folders that are connection destinations of the fifth management target, and the sixth management target is unreached by tracing one or a plurality of folders that are only connection sources of the fifth management target.

\* \* \* \* \*